March 30, 1965  H. M. SCHWEIGHOFER  3,176,265
FLIGHT DIRECTOR DISPLAY
Filed March 14, 1962  3 Sheets-Sheet 1
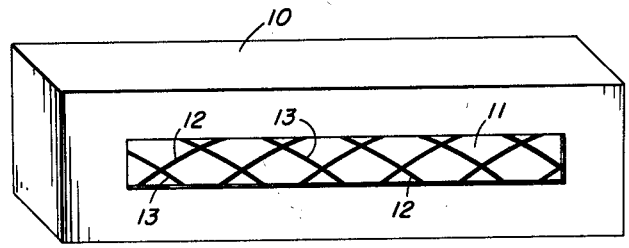
FIG 1
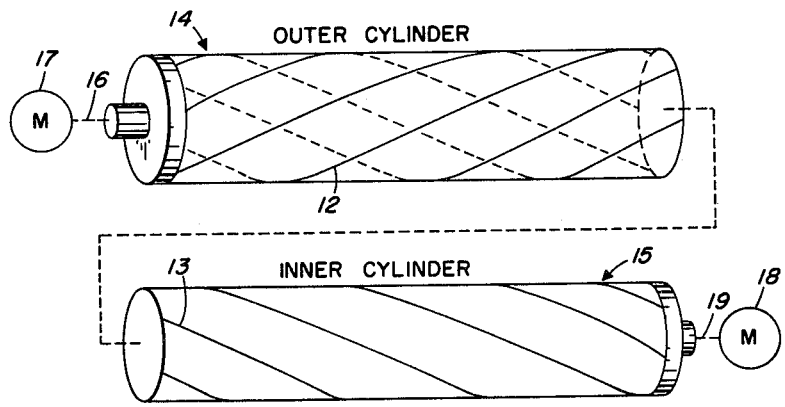
FIG 2
FIG 3
| MOTION OF: | | APPARENT MOTION OF DISPLAY |
|---|---|---|
| OUTER CYLINDER | INNER CYLINDER | |
| ↑ | ↑ | ↑ |
| ↓ | ↓ | ↓ |
| ↓ | ↑ | → |
| ↑ | ↓ | ← |
INVENTOR.
HORST M. SCHWEIGHOFER
BY Moody & Anderson
AGENTS

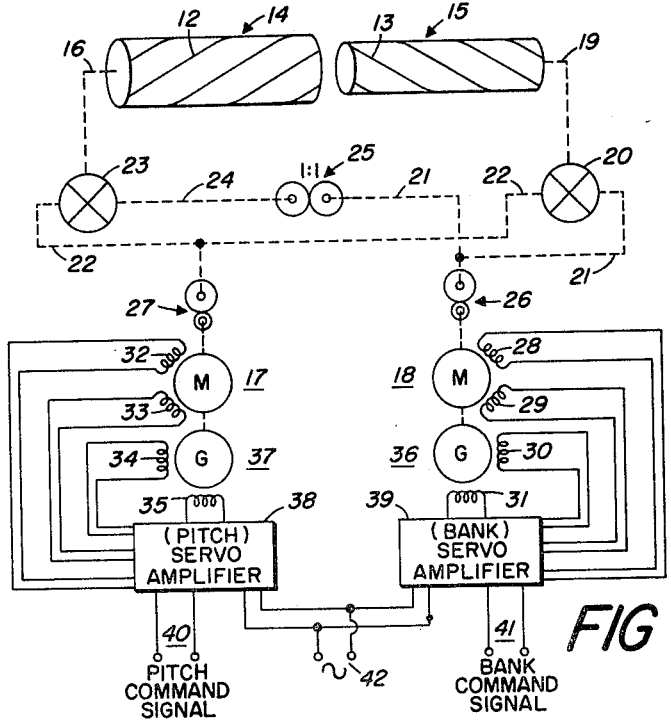
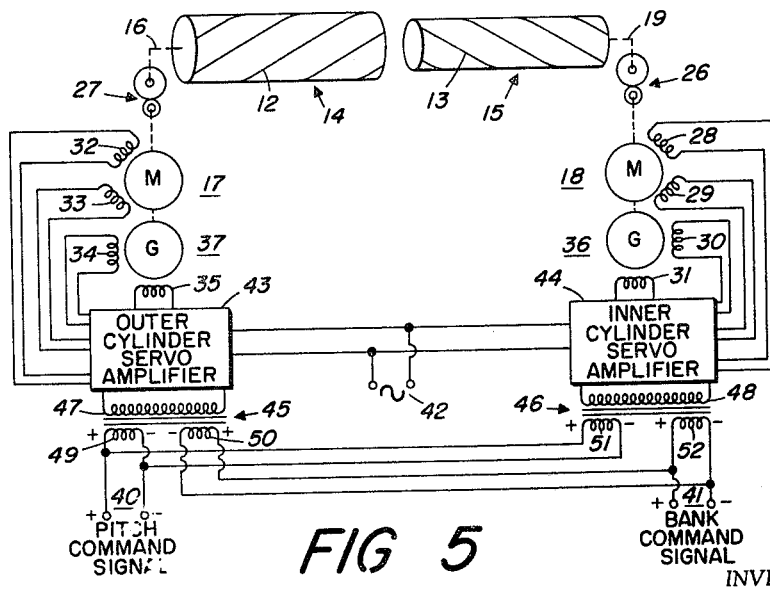

March 30, 1965 H. M. SCHWEIGHOFER 3,176,265
FLIGHT DIRECTOR DISPLAY
Filed March 14, 1962 3 Sheets-Sheet 3

INVENTOR.
HORST M. SCHWEIGHOFER
BY Moody & Anderson
AGENTS

United States Patent Office 3,176,265
Patented Mar. 30, 1965

3,176,265
FLIGHT DIRECTOR DISPLAY
Horst M. Schweighofer, Cedar Rapids, Iowa, assignor to Collins Radio Company, Cedar Rapids, Iowa, a corporation of Iowa
Filed Mar. 14, 1962, Ser. No. 179,683
1 Claim. (Cl. 340—27)

This invention relates generally to display apparatus and more particularly to an improved type of an aircraft flight director display. The invention employs a motion display technique utilizing the apparent motion of geometric patterns formed from superimposed complementary line patterns as effected by imparting particular rates and direction of translation of the line patterns in response to aircraft pitch and bank command signals, the latter being those signals formulated in flight director computer circuitry.

The present invention provides a special pilot aid in the landing of aircraft wherein the command motion display may be viewed by means of peripheral vision allowing the pilot to scan other instrumentation as necessary and allowing the pilot to maintain visual contact with the approaching ground or runway.

Current aircraft instrumentation techniques are known by which position, attitude, and flight director command information is computed and displayed on instruments. The instruments may be used for monitoring an automatic approach or for making a manual approach. Under approach conditions, however, a pilot's attention cannot be directed exclusively to these indicators. It is necessary that the pilot be permitted to scan the instrument panel and the windshield area and still achieve the control accuracy required during an instrument approach.

It is an object of the present invention to provide a form of display which permits a "heads up" approach on the part of the pilot, that is, permits the pilot to be aware of and instinctively respond to a display command without directly focusing his eyes on the display apparatus.

Present day landing techniques, as sophisticated as they may be, still necessitate visual contact with the ground by the pilot during the last portion of the approach prior to touchdown. The pilot thus must scan the windshield area to prepare himself for visual contact, but the pilot who is concentrating primarily on picking up visual contacts must additionally insure himself of the progress of the approach by quick glances at flight directing indications to assure, for example, that his aircraft attitude, air speed, crab angle, etc., are proper for touchdown.

The present invention provides a solution to ease this double demand on the part of the pilot by making greater use of the pilot's peripheral vision which is currently used primarily for the detection of various indicating and warning lights. Peripheral vision is better suited to detect motion than to detect the position of a pointer and thus the present invention provides a display of flight commands by means of motion.

Accordingly, it is an object of the present invention to provide a flight director display which will permit the pilot to observe and react to the basic display while looking for visual contact before landing.

An approach to the utilization of extra-foveal perception in aircraft indicators has been described by Smiths Aircraft Instruments, Incorporated in Aviation Week magazine of July 11, 1960. This known approach provides rotatable helically-striped cylinders, the rotation of which gives the illusion of line patterns moving along a viewing slot. The referenced Smiths system utilizes one such arrangement in a forward location to provide left and right bank commands and two other units located to either side of the pilot to provide pitch commands. The present invention is an improvement on this general approach by which line patterns may be superimposed to provide a combined display to indicate pure pitch commands, pure bank commands, and various combined pitch and bank commands on a single unit which may be preferably located forward of the pilot and preferably at the base of the windshield. The present invention is featured in the provision of a pair of superimposed complementary line patterns, the relative movements of which are controlled in a novel manner by a pair of servo positioning systems which effect translation of the line patterns in response to various combinations of pitch command and bank command signals.

These and other objects and features of the present invention will become apparent upon reading the following description in conjunction with the accompanying drawings, in which:

FIGURE 1 illustrates a display indicator, in accordance with the present invention, as it may appear to the observer;

FIGURE 2 illustrates the general concept of the basic operation of an embodiment of an invention;

FIGURE 3 is a diagrammatic representation of the apparent display motion of the device of FIGURE 1 resulting from particular motions of the line patterns indicated in FIGURE 2;

FIGURE 4 is a functional diagram indicating a display drive embodiment which may be utilized with the arrangement of FIGURE 2;

FIGURE 5 is a further embodiment of a display drive arrangement for use with the devices of FIGURE 2.

Figure 6:
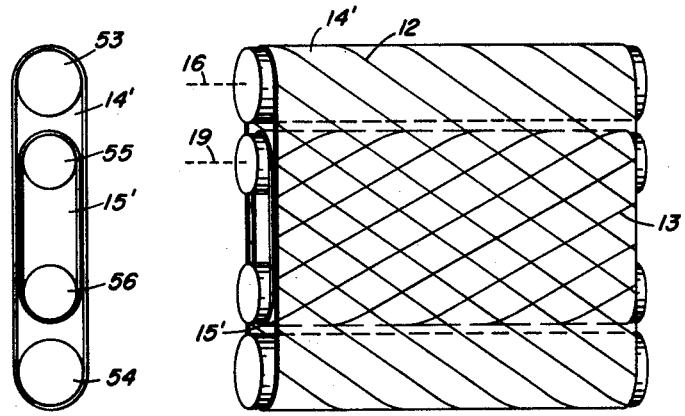
FIGURES 6, 7, and 8 represent further embodiments of super-imposed line patterns which may be utilized with the display drive apparatus of either FIGURE 4 or 5.

The apparent motion concept utilized in the invention is that presented to an observer when viewing superimposed patterns of oppositely inclined lines or stripes when each of the patterns is given a particular motion. Such an overlay pattern is visualized as a pattern of diamondlike shapes. With translation of each of such a pair of superimposed line patterns in the same sense of direction at the same rate, the viewed diamond pattern shifts accordingly. With translation of the patterns in mutually opposite senses of direction at the same rate the diamond pattern viewed is given apparent motion at right angles to the actual motion of the individual line patterns. Translation of the patterns at differing rates produces an apparent motion which is a combination of the foregoing effects. The latter expedient may be utilized to produce an apparent motion of the pattern in any direction.

This pattern motion is particularly adaptable to dynamic display of aircraft pitch and bank commands which are analogous to the up-down and left-right pattern shifts. The present invention provides an indicator utilizing this concept which is responsive to aircraft pitch and bank command signals to produce readily interpretable pattern shifts or pattern apparent motions in response to which the pilot reacts instinctively to pitch and/or bank the aircraft to slow down or stop the motion of the pattern. Thus, a pattern shift to the right commands quite naturally a banking movement to the right to "catch up" with the shifting motion and stop such motion. Similarly a pattern shift upwardly provides a natural and easily interpretable command to pitch the aircraft upward to "catch up" with the movement and stop the movement.

The present invention utilizes first and second geometric patterns having mutually opposite or complementary inclination. The coaction of such patterns as regards their relative translation as viewed by the observer lends itself to a novel coacting servo positioning control to effect the necessary translations.

With the above concept in mind, reference is made to FIGURE 1 which pictures an indicator in accordance with the present invention. The indicator comprises a housing 10 with a viewing slot 11 formed therein through which the observer views the pattern shift resulting from relative translations of a first plurality of diagonally inclined parallel lines or stripes 12 in conjunction with a second group of oppositely inclined parallel lines 13, each group of lines 12 and 13 being given movement. The pattern of lines 12 is formed on a first member which is superimposed over a second member carrying a pattern of lines 13.

FIGURE 2 illustrates an arrangement for effecting translation of the patterns of lines 12 and 13 with respect to the horizontal axis of the instrument. FIGURE 2 illustrates two concentric cylinders formed respectively with left and right hand helices on the surface thereof, the viewable portions of which correspond to the viewed patterns of lines 12 and 13 of FIGURE 1. Each of the cylinders 14 and 15 is rotatable by a separate associated motor device 17 or 18. It is apparent that clockwise rotation imparted to cylinder 14 by motor 17 imparts a shift to the helices 12, as viewed in FIGURE 1. Alternatively, counterclockwise rotation of cylinder 14 imparts an opposite translation to the helices 12. The sense of translation of the viewable lines is determined by the relative direction of rotation of the associated motor. It is apparent that in an actual embodiment the outer cylinder 14 might be formed of transparent material through which the lines 13 on the inner cylinder could be viewed. The inner cylinder 15 may, for example, be made of a transluscent material with a light source (not illustrated) located in or directing light to the inside of the inner cylinder and with the helices or lines 12 or 13 taking the form of relatively narrow opaque bands. The resulting pattern with this internal illumination would be a series of lighted squares or diamond shapes separated by opaque bands.

In accordance with the present invention the generalized operation of the embodiment of FIGURE 2 may be summarized as follows: a concurrent rotation of the cylinders 14 and 15 by their associated motors 17 and 18 causes the viewable pattern of diamond configurations to move up or down to produce a pitch command. Counter rotation of the cylinders 14 and 15 by the associated motors at the same speeds causes the pattern to appear to move right or left for roll or bank commands. Rotation of one or both of cylinders 14 and 15 at differing speeds produces a combined roll and pitch command. The general operation is indicated diagrammatically in FIGURE 3, which indicates up and down apparent motion of display in response to simultaneous like directions of rotation of the inner and outer cylinders and further indicates left and right apparent motions of display in response to mutually opposite rotation of the cylinders.

In order that the above described apparent motion concept be utilized as a flight director indication, an interrelated drive including synchronization means must be employed to rotate the cylinders so as to cause necessary line translation in response to the independent or simultaneous presence of pitch and bank command signals.

FIGURE 4 illustrates a means for utilizing mechanical interconnection to effect the desired rotation. FIGURE 4 shows a display drive system in conjunction with the cylindrical display embodiment of FIGURE 2. The drive system employs two servo positioning systems. A pitch command signal 40 is applied as input to a pitch servo amplifier 38, the latter functioning to drive a split phase motor 17 in a direction and at a rate proportional to the sense and amplitude of the pitch command signal 40. The function of the pitch servo amplifier 38 is conventional and serves to provide a variable phase output to a winding 33 of motor 17. The output might, for example, be in or out of phase with a reference voltage source 42 which is conventionally applied to the fixed phase winding 32 of motor 17. Numerous servo amplifier techniques may be employed herein to effect rotation of motor 17 in a direction corresponding to the sense (polarity or phase) of the pitch command signal 40 and at a rate determined by the amplitude of the pitch command signal 40. Rotation of motor 17 is imparted to a tachometer generator 37 which includes an energizing winding 35 and a rate feedback winding 34 by which a rate follow-up is applied to the servo amplifier to provide a smooth relationship of rotational speed to the magnitude of the input command signal 40.

A second servo system includes a bank servo amplifier 39 to drive motor 18 at a rate and in a direction corresponding to the magnitude and sense of a bank input command signal 41. Motor 18 is similarly provided with fixed and variable phase windings 28 and 29 wherein the phase is referred to the reference source 42 and includes a tachometer generator 36 with energizing and feedback windings 30 and 31 for rate feedback purposes.

As previously stated, a pitch indication necessitates the same direction of rotation of each of the cylinders 14 and 15 so that the translations of the associated lines 12 and 13 are in the same sense to give an apparent upward or downward motion of the viewed diamond pattern. For this purpose the drive system of FIGURE 4 supplies the rotational output from the pitch responsive motor 17 through a gear reduction means 27 as a first rotational input 22 to each of mechanical differentials 23 and 20. The output 16 of mechanical differential 23 drives the outer cylinder 14, and the output 19 of differential 20 is utilized to rotate the inner cylinder 15. Thus, a pitch command input signal, in the absence of a bank command signal, effects the same direction of rotation of each of the cylinders 14 and 15 at the same rate which meets the aforedescribed drive requirement.

Similarly, a pure bank indication necessitates an opposite direction of rotation or counter-rotation of the cylinders 14 and 15 at the same rate such that the associated groups of lines 12 and 13 shift in the same sense of direction at the same rate and the viewed diamond pattern shifts accordingly to the left or right. This requirement is uniquely fulfilled by providing the rotational movement of the bank responsive motor through gear reduction means 26 as a direct input 21 to the second input of mechanical differential 20 and as an oppositely imposed, but like rate of rotation, to the second input 24 of the mechanical differential 23. The oppositely imposed rotational input may be attained quite simply by a pair of gears with one-to-one ratio inserted between the second input 24 of mechanical differential 23 and the output 21 from gear reduction means 26. It is thus seen that the drive system, in response to a bank command signal and in the absence of a pitch command signal, effects counter rotation of cylinders 14 and 15 at the same rate. It may further be seen that simultaneous pitch and bank commands are readily combined through the mechanical differentials so as to impart relatively different rates of rotation of the cylinders with corresponding combined translation of the viewed diagonal pattern.

FIGURE 5 illustrates a further display drive embodiment by which the desired coaction between the two motor drives is realized. The embodiment of FIGURE 5 utilizes electrical interconnection for combination of pitch and bank command signals with appropriate phasing to produce the desired directions of rotation under conditions of pure pitch command input, pure bank command input, and combinations of simultaneous pitch and bank command application. With reference to FIGURE 5, cylinder 14 is seen to be rotated in accordance with the rotation of servo motor 17 through appropriate gear reduction means 27. Similarly, cylinder 15 is rotated in accordance with the rotation of servo motor 18 through like gear reduction means 26. Motor 17 is driven in accordance with an outer cylinder servo amplifier 43 while servo motor 18 is driven in accordance with an inner cylinder servo amplifier 44. Each of these servo amplifiers 43 and 44 may be similar in operation to the above described pitch and bank servo amplifiers 38 and 39. In the embodiment of FIGURE 5, however, the servo amplifiers are referred to as outer and inner cylinder servo amplifiers rather than pitch and bank amplifiers, since they effect rotation of their associated cylinders by means of servo motors 17 and 18 in response to composite pitch and bank command signal inputs. This embodiment, rather than utilizing mechanical interconnection, employs differential combination of the pitch and bank command signals at the servo amplifier inputs, including proper phasing to produce the required directions of rotation. This addition and phasing technique might be accomplished in various ways. FIGURE 5 illustrates transformer addition with instantaneous polarities to indicate phasing. The input to servo amplifier 43 is taken from the secondary winding 47 of an input transformer 45. Transformer 45 includes primary windings 49 and 50. Similarly, the input to the inner cylinder servo amplifier 44 is taken from the secondary winding 48 of an input transformer 46 which includes primary windings 51 and 52. The pitch command signal is applied to primary winding 49 of transformer 45 and primary winding 51 of transformer 46 with like phasing. The bank command signal 41 is applied to primary winding 50 of transformer 45 and primary winding 52 of transformer 46 in a mutually opposite phase relationship, as indicated by the instantaneous polarities. Thus a pure pitch command signal provides in-phase inputs to each of the cylinder servo amplifiers and results in rotational outputs in the same direction as required. Further the application of a pure bank command signal 41 in the absence of a pitch command signal imparts inputs to each of the servo amplifiers of the same magnitude, but of opposite phase, resulting in rotational outputs opposite in direction and of the same rate as required.

While the above discussion has centered about the employment of concentric cylinders with oppositely disposed helical line patterns formed on the surfaces as a means for effecting motion of the line patterns, further expedients may be employed with the display drives of FIGURES 4 and 5 to arrive at the apparent motion indication in accordance with the invention.

FIGURE 6 illustrates an arrangement which might be utilized in lieu of the concentric cylinders previously described wherein tape members 14' and 15' carried on rollers 53–54 and 55–56 are provided with patterns of oppositely inclined parallel lines 12 and 13. Tape member 15' and its roller mounting means would be contained within the confines of the outer tape member 14'. Rotational input to the horizontal axes of the two tapes may be imparted from the mechanical outputs 16 and 19 from either of the display drive mechanisms of FIGURES 4 and 5, it being seen that rotational input 16 imparts a translation of the lines 12. Rotational input 19 effects a corresponding translation of lines 13.

Figure 7:
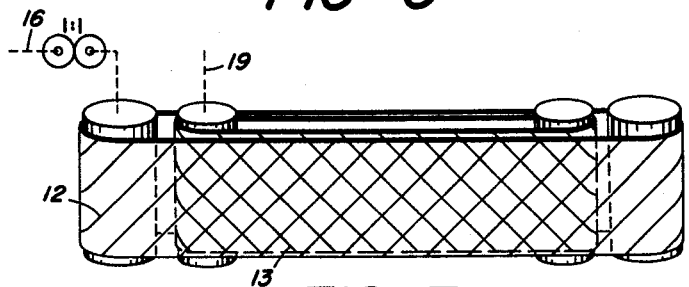

FIGURE 7 illustrates an indicating embodiment employing tapes with diagonally inclined lines thereon wherein the axes of the tape rollers are placed vertically. In this embodiment, as employed with the display drives of FIGURES 4 and 5, a reversal of the relative rotations of one of the tapes is necessary so that the tapes move in the same directions for roll commands and in opposite directions for pitch commands. This relative reversal of the direction of motion of one of the inputs may be accomplished by including a simple one-to-one gear drive in the rotational input drive 16 to one of the tape rollers, as illustrated.

Figure 8:
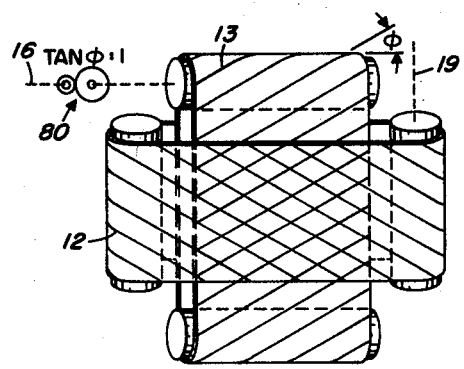

FIGURE 8 illustrates still another embodiment employing superimposed tape members wherein the tape axes are crossed. In this embodiment drive systems of FIGURES 4 and 5 are again altered slightly for the arrangement illustrated in FIGURE 8. A pure pitch-up command requires the vertical tape to move upward and the horizontal tape to move to the right with the relative speeds between the respective tapes being proportional to the tangent of the angle of the stripes on the tape surfaces, the latter being designated as the angle $\phi$. Modification of the drive systems of FIGURES 4 and 5 for use in combination with display of the embodiment of FIGURE 8 necessitates a variation in the relative speeds at which the tapes are driven by an amount proportional to the tangent $\phi$ which might be attained by the insertion in one of the tape rotational inputs 16 of an additional gear drive having a ratio of tan $\phi$:1, as illustrated. The effect might also be achieved through appropriate transformer winding ratios in the drive embodiment of FIGURE 5.

The present invention is thus seen to provide a novel flight director of the type utilizing apparent motion which may be discerned by peripheral vision to command aircraft control without necessitating exacting scrutiny by the observer.

Although the invention has been described with respect to particular embodiments thereof it is not to be so limited as changes might be made therein which fall within the scope of the invention as defined within the appended claim.

I claim:

A flight directing indicator of the apparent motion indicating type responsive to first and second input signals indicative respectively of aircraft pitch and bank commands, comprising a first member including a viewable surface portion upon which a plurality of parallel lines are disposed, said lines being diagonally inclined with respect to said movable surface portion, a second member including a viewable surface portion upon which a plurality of like disposed parallel lines are affixed with diagonal inclination opposite those lines on said first member, means superimposing the viewable portions of each of said first and second members, bidirectional positioning means connected to each of said members, said positioning means adaptable to effect translation of the viewable lines on each of said viewable surface portions, said positioning means including means effecting a like rate of displacement of said viewable lines on said first and second members in the same direction in response to an input bank command signal and in the absence of the input pitch command signal, said positioning means including means to effect a like rate of displacement of the viewable lines on each of said members in mutually opposite directions in response to an input pitch command signal and in the absence of an input bank command signal, said positioning means including means to effect rates of displacement and relative directions of displacement of said members in proportion to the magnitude and sense, respectively, of said input pitch and bank command signals, and said positioning means including means differentially responsive to the simultaneous presence of both of said input pitch and bank command signals in response to which the geometric pattern formed by the viewable overlap of said first and second plurality of lines shifts with apparent motion corresponding to independent and composite commands as determined by the relative magnitudes and senses of said input pitch and bank command signals; wherein said positioning means comprises first and second servo positioning systems, the outputs of which are respectively connected to and effect translation of the viewable lines on said first and second members, each of said servo positioning systems including a servo amplifier responsive to the phase and magnitude of the input signal thereto to effect a predetermined rotational output, each of said servo amplifiers including input means, means connecting said pitch command signal and bank command signal to the input means of each of said amplifiers, said amplifier input means including phasing means to combine said pitch and bank command signals whereby said servo amplifiers effect associated rotational outputs of like rate and direction in response to an input pitch command signal in the absence of an input bank command signal and effect associated rotational outputs of like rate and mutually opposite direction in response to input bank command signals in the absence of input pitch command signals; wherein said phasing means comprises a transformer having a secondary winding and first and second like wound primary windings; and wherein said pitch command signal is connected with like polarization to each of the first primary windings of said transformers, said bank command signal being connected with opposite polarization to each of the second primary windings of the said transformers, said polarizations being such that like instantaneous polarities of said pitch and bank command signals differentially subtract as applied to one of said servo amplifiers and add as applied to the other of said servo amplifiers.

References Cited in the file of this patent

UNITED STATES PATENTS

| | | |
|---|---|---|
| 2,213,261 | Sayre | Sept. 3, 1940 |
| 2,218,929 | Kenyon | Oct. 22, 1940 |
| 2,291,635 | Kenyon | Aug. 4, 1942 |
| 2,307,590 | Kenyon | Jan. 5, 1943 |
| 3,085,429 | Majendie | Apr. 16, 1963 |

OTHER REFERENCES

Tunstall, John: "Pilot Aid Designed for Automatic Landing," Aviation Week, July 11, 1960, pp. 83–84.